(12) United States Patent
Ji et al.

(10) Patent No.: US 10,671,827 B2
(45) Date of Patent: Jun. 2, 2020

(54) METHOD AND DEVICE FOR FINGERPRINT VERIFICATION

(71) Applicant: Beijing Xiaomi Mobile Software Co., Ltd., Beijing (CN)

(72) Inventors: Chuanshun Ji, Beijing (CN); Zhongsheng Jiang, Beijing (CN); Tianyuan Wo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 266 days.

(21) Appl. No.: 15/622,110

(22) Filed: Jun. 14, 2017

(65) Prior Publication Data

US 2017/0372111 A1 Dec. 28, 2017

(30) Foreign Application Priority Data

Jun. 27, 2016 (WO) ................ PCT/CN2016/087275

(51) Int. Cl.
*G06K 9/00* (2006.01)
*G06F 21/32* (2013.01)
*G06F 21/34* (2013.01)

(52) U.S. Cl.
CPC .......... *G06K 9/0002* (2013.01); *G06F 21/32* (2013.01); *G06F 21/34* (2013.01); *G06F 2221/2139* (2013.01); *G06K 9/00087* (2013.01)

(58) Field of Classification Search
CPC .. G06F 21/32; G06F 21/34; G06F 2221/2139; G06K 9/0002; G06K 9/00087

USPC ......................................... 382/124, 209, 218
See application file for complete search history.

(56) References Cited

U.S. PATENT DOCUMENTS

| 8,108,672 B1 * | 1/2012 | Herbach ............. G06F 21/6218 705/51 |
| 2004/0234107 A1 | 11/2004 | Machida et al. |
| 2011/0090047 A1 | 4/2011 | Patel |

(Continued)

FOREIGN PATENT DOCUMENTS

| CN | 103377364 A | 10/2013 |
| CN | 104156709 A | 11/2014 |

(Continued)

OTHER PUBLICATIONS

Extended European Search Report issued in European Patent Application No. 17166716.5, mailed from the European Patent Office, dated Oct. 30, 2017.

(Continued)

*Primary Examiner* — Daniel G Mariam
(74) *Attorney, Agent, or Firm* — Finnegan, Henderson, Farabow, Garrett & Dunner, L.L.P.

(57) ABSTRACT

The present disclosure relates to a method for fingerprint verification. The method includes performing a first fingerprint verification to obtain a first verification result in a process during which a physical key provided with a fingerprint verification component is pressed. If the first verification result is a failed verification, the method further includes performing a second fingerprint verification to obtain a second verification result in a process during which the physical key is raised, and using the second verification result as a final verification result of fingerprint verification.

12 Claims, 6 Drawing Sheets

(56) References Cited

U.S. PATENT DOCUMENTS

| | | | |
|---|---|---|---|
| 2012/0127179 A1* | 5/2012 | Aspelin | G06F 21/32 |
| | | | 345/441 |
| 2013/0335322 A1 | 12/2013 | Russo | |
| 2014/0140587 A1 | 5/2014 | Ballard et al. | |
| 2015/0074418 A1 | 3/2015 | Lee et al. | |
| 2015/0086090 A1 | 3/2015 | Jung et al. | |
| 2015/0146945 A1* | 5/2015 | Han | G06K 9/00033 |
| | | | 382/125 |
| 2016/0171281 A1* | 6/2016 | Park | G06F 1/1643 |
| | | | 382/124 |
| 2017/0316250 A1* | 11/2017 | Roh | G06K 9/00087 |

FOREIGN PATENT DOCUMENTS

| | | |
|---|---|---|
| CN | 105574476 A | 5/2016 |
| EP | 2848196 A1 | 3/2015 |
| JP | 2-191083 A | 7/1990 |
| JP | 2001-101404 A | 4/2001 |
| JP | 2001-167280 A | 6/2001 |
| JP | 2001-266109 A | 9/2001 |
| JP | 2007018346 A | 1/2007 |
| KR | 20150029495 A | 3/2015 |
| RU | 114540 U1 | 3/2012 |
| WO | WO 2004/057523 A1 | 7/2004 |

OTHER PUBLICATIONS

International Search Report of PCT Application No. PCT/CN2016/087275, issued by the ISA/CN—State Intellectual Property Office of the P.R. China, dated Mar. 27, 2017.

\* cited by examiner

METHOD AND DEVICE FOR FINGERPRINT VERIFICATION

CROSS-REFERENCE TO RELATED APPLICATION

The present application is based upon and claims priority to PCT International Application No. PCT/CN2016/087275, filed Jun. 27, 2016, the entire contents of which are incorporated herein by reference.

TECHNICAL FIELD

The present disclosure generally relates to the field of computer technology, and more particularly, to a method and device for fingerprint verification.

BACKGROUND

A fingerprint verification component may be provided in a physical key on a terminal, and fingerprint verification may be performed with respect to a user while the user is pressing the physical key.

Prior to the fingerprint verification, the terminal collects a fingerprint of a finger through the fingerprint verification component, and the collected fingerprint is used as a reference fingerprint. During a process of the fingerprint verification, the terminal collects a fingerprint to match with the user through the fingerprint verification component, and detects whether the fingerprint to be matched is the same as the reference fingerprint. If the fingerprint to be matched is the same as the reference fingerprint, the fingerprint verification is determined to be successful.

SUMMARY

According to a first aspect of embodiments of the present disclosure, there is provided a method for fingerprint verification. The method includes performing a first fingerprint verification to obtain a first verification result in a process during which a physical key provided with a fingerprint verification component is pressed. If the first verification result is a failed verification, the method further includes performing a second fingerprint verification to obtain a second verification result in a process during which the physical key is raised, and using the second verification result as a final verification result of fingerprint verification.

According to a second aspect of embodiments of the present disclosure, there is provided a device for fingerprint verification. The device includes a processor and a memory for storing instructions executable by the processor. The processor is configured to perform a first fingerprint verification to obtain a first verification result in a process during which a physical key provided with a fingerprint verification component is pressed. If the first verification result is a failed verification, the processor is further configured to perform a second fingerprint verification to obtain a second verification result in a process during which the physical key is raised, and to use the second verification result as a final verification result of fingerprint verification.

According to a third aspect of embodiments of present disclosure, there is provided a non-transitory computer-readable storage medium having stored thereon instructions that, when executed by a processor of a device, cause the device to perform a method for fingerprint verification. The method includes performing a first fingerprint verification to obtain a first verification result in a process during which a physical key provided with a fingerprint verification component is pressed. If the first verification result is a failed verification, the method further includes performing a second fingerprint verification to obtain a second verification result in a process during which the physical key is raised, and using the second verification result as a final verification result of fingerprint verification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely exemplary apparatuses and methods consistent with aspects related to the present disclosure as recited in the appended claims.

Figure 1:
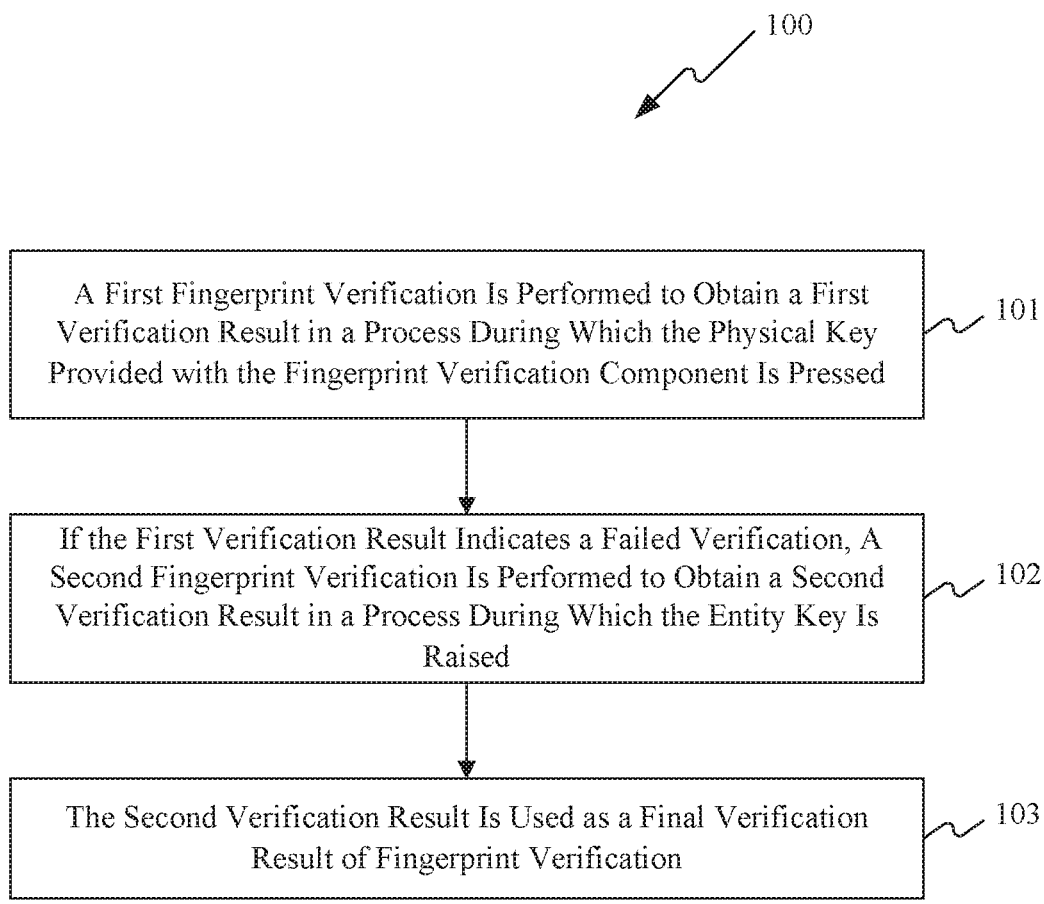
FIG. 1 is a flowchart of a method for fingerprint verification according to an exemplary embodiment.

FIG. 1 is a flowchart of a method 100 for fingerprint verification according to an exemplary embodiment. The method 100 may be applied in a terminal that includes a physical key provided with a fingerprint verification component. The fingerprint verification component may be implemented with software, or hardware, a combination of software and hardware. As shown in FIG. 1, the method 100 may include the following steps.

In step 101, a first fingerprint verification is performed to obtain a first verification result in a process during which the physical key provided with the fingerprint verification component is pressed.

In step 102, if the first verification result indicates a failed verification, a second fingerprint verification is performed to obtain a second verification result in a process during which the physical key is raised.

In step 103, the second verification result is used as a final verification result of fingerprint verification.

In the method 100 for fingerprint verification provided by the present disclosure, a first fingerprint verification is performed to obtain a first verification result in a process during which a physical key provided with a fingerprint verification component is pressed. If the first verification result indicates a failed verification, a second fingerprint verification is performed to obtain a second verification result in a process during which the physical key is raised. And the second verification result is used as a final verification result of fingerprint verification. In this way, two fingerprint verifications may be performed when a user performs one pressing operation on the physical key. Thus, failure of fingerprint verification may be eliminated. Such failure of fingerprint verification may result from, for example. fingerprint deformation due to an excessive force during a pressing process, or a displacement between a finger and the fingerprint verification component. Accordingly, a success rate of fingerprint verification may be improved.

Figure 2:
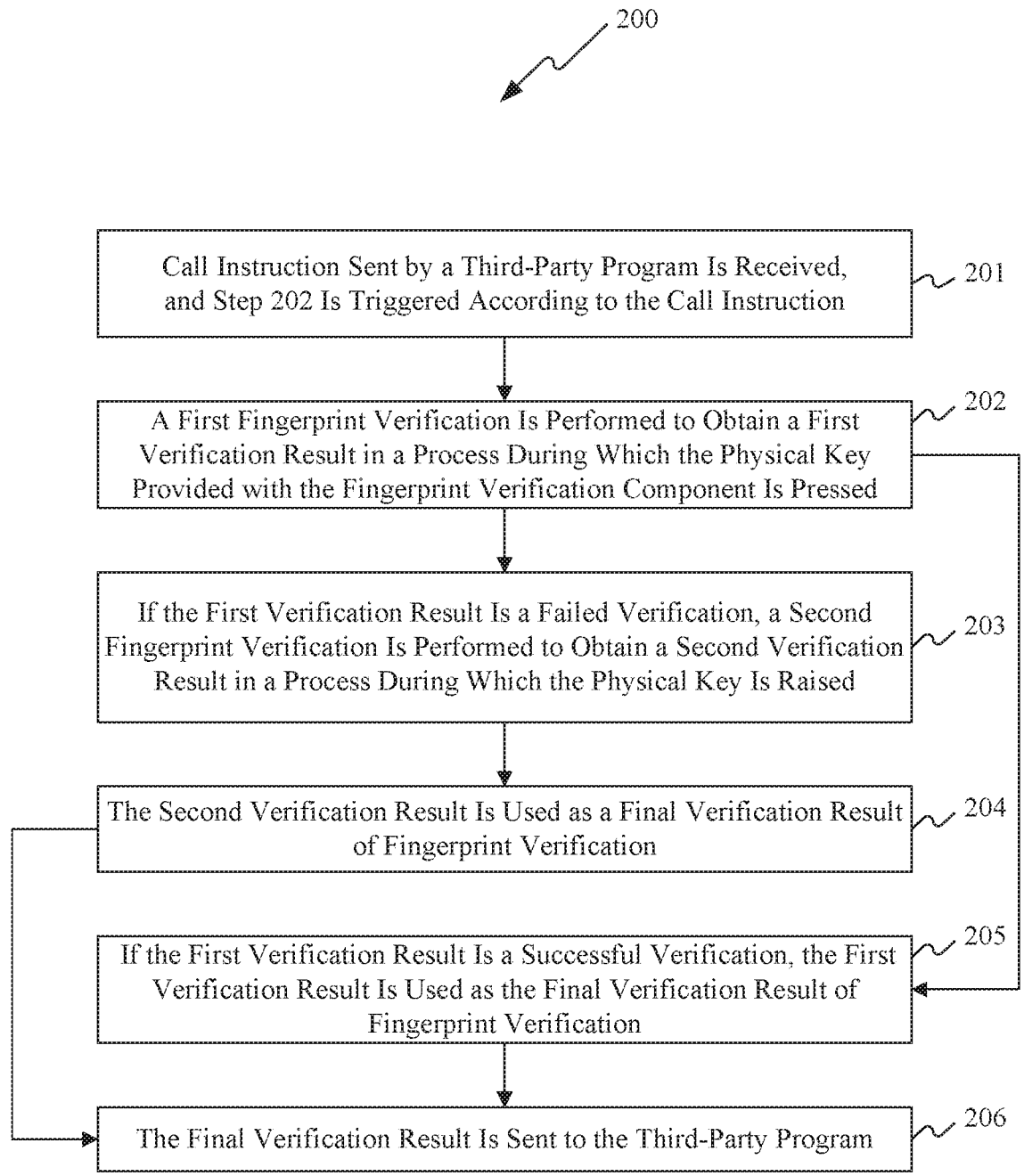
FIG. 2 is a flowchart of a method for fingerprint verification according to another exemplary embodiment.

FIG. 2 is a flowchart of a method 200 for fingerprint verification according to another exemplary embodiment. The method 200 may be applied in a terminal that includes a physical key provided with a fingerprint verification component. The fingerprint verification component may be implemented with software, or hardware, a combination of software and hardware.

In the exemplary embodiment, the method 200 for fingerprint verification provided by the present embodiment is performed by the fingerprint verification component provided in the physical key. The fingerprint verification component may include, at least, a fingerprint sensor and a processing chip. The fingerprint sensor is configured to collect a fingerprint of a finger operating on the physical key (which is a fingerprint to be verified, i.e., a to-be-verified fingerprint), and to send the to-be-verified fingerprint to the processing chip. The processing chip is configured to read a pre-stored reference fingerprint, and to compare the to-be-verified fingerprint with the reference fingerprint to obtain a verification result.

The method 200 for fingerprint verification provided by the present disclosure may be applied in different fingerprint verification scenarios. The verification scenarios may include, for example, a verification scenario when unlocking a screen of the terminal, a verification scenario when making a payment, a verification scenario when reading encrypted information, a verification scenario when downloading an application, a verification scenario when deleting information, and the like. Regardless of the verification scenario, when the method 200 for fingerprint verification is implemented, the fingerprint verification component may be called by a third-party program, to perform fingerprint verification and to return a verification result to the third-party program.

Referring to FIG. 2, in step 201, a call instruction sent by a third-party program is received, and step 202 is triggered according to the call instruction.

For example, when an operation triggered by a user is received by the third-party program and a fingerprint verification is determined to be performed with respect to the user according to a preset setting, the third-party program sends the call instruction to the fingerprint verification component provided in the physical key. The call instruction is configured to instruct the fingerprint verification component to perform a verification on a fingerprint of a finger operating on the physical key, that is, to perform the step 202.

Figure 3:
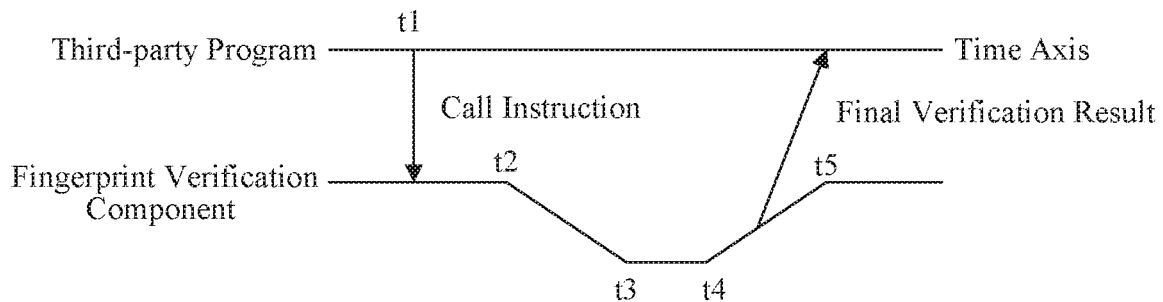
FIG. 3 is a diagram showing a timing sequence of fingerprint verification according to an exemplary embodiment.

FIG. 3 is a diagram of a timing sequence of fingerprint verification when the method 200 is performed, according to an exemplary embodiment. In the exemplary embodiment, the third-party program sends the call instruction to the fingerprint verification component at a time t1.

In step 202, a first fingerprint verification is performed to obtain a first verification result in a process during which the physical key provided with the fingerprint verification component is pressed.

Figure 4:
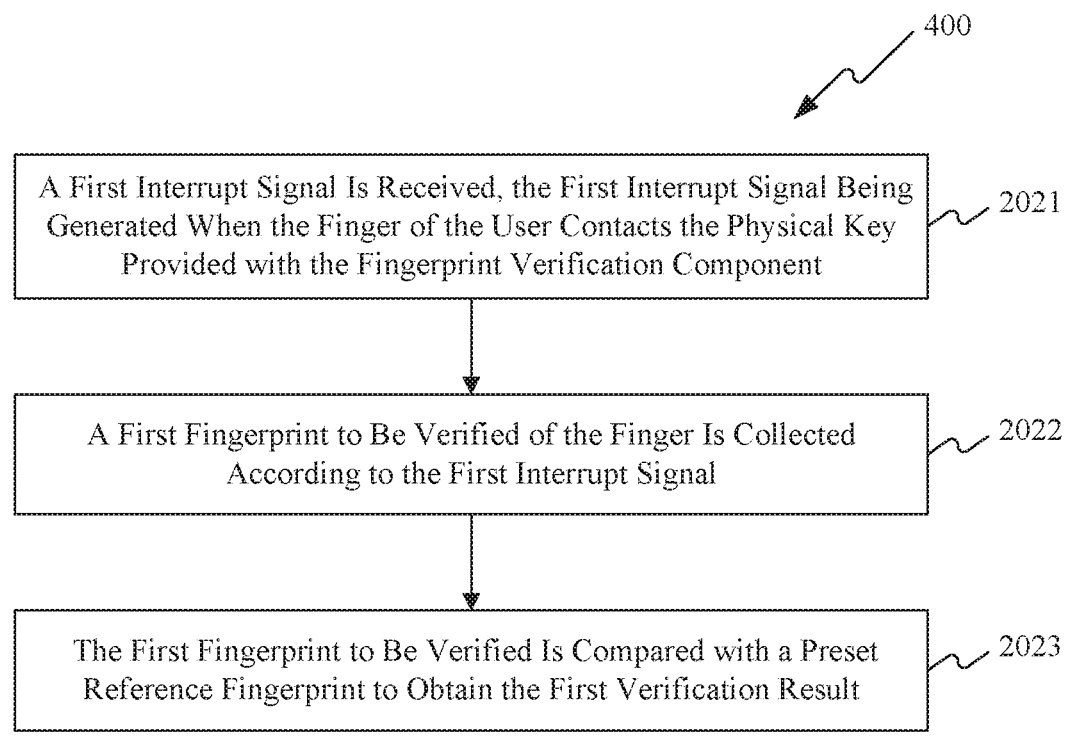
FIG. 4 is a flowchart of a method for a first fingerprint verification according to an exemplary embodiment.

FIG. 4 is a flow chart of a method 400 for performing the first fingerprint verification, according to an exemplary embodiment. The method 400 may be used in the step 202.

In step 2021, a first interrupt signal is received, the first interrupt signal being generated when the finger of the user contacts the physical key provided with the fingerprint verification component.

When the finger of the user contacts the physical key, the fingerprint verification component receives the first interrupt signal. In FIG. 3, when a time at which the finger of the user contacts the physical key is t2, the fingerprint verification component receives the first interrupt signal at the time t2.

In step 2022, a first fingerprint to be verified (i.e., a first to-be-verified fingerprint) of the finger is collected according to the first interrupt signal.

In step 2023, the first to-be-verified fingerprint is compared with a preset reference fingerprint to obtain the first verification result.

In general, a time period taken by the fingerprint verification component for performing the first fingerprint verification is relatively short, and the first fingerprint verification can be done before the user completes pressing the physical key. In FIG. 3, when a time at which the user completes pressing the physical key is t3, the fingerprint verification component can obtain the first verification result before the time t3.

Referring back to FIG. 2, in step 203, if the first verification result is a failed verification, a second fingerprint verification is performed to obtain a second verification result in a process during which the physical key is raised.

In the exemplary embodiment, when the user presses the physical key, if an excessive force is applied, a surface of the finger may be deformed, which may result in that the first fingerprint collected by the fingerprint verification component is inaccurate. Also, a displacement may be generated between the finger and the physical key during the process of pressing the physical key and prior to raising the physical key, which may also result in that the first fingerprint collected by the fingerprint verification component is inaccurate. In both cases, when the fingerprint verification component compares the first to-be-verified fingerprint with the reference fingerprint, the first verification result obtained by the fingerprint verification component may still be a failed verification even if the finger pressing the physical key is the finger from which the reference fingerprint is collected. In order to overcome the problem associated with the failed verification due to inaccurate collection of the first to-be-verified fingerprint, the fingerprint verification component may perform a second fingerprint verification in the process in which the physical key is raised, to improve the success rate of fingerprint verification.

Figure 5:
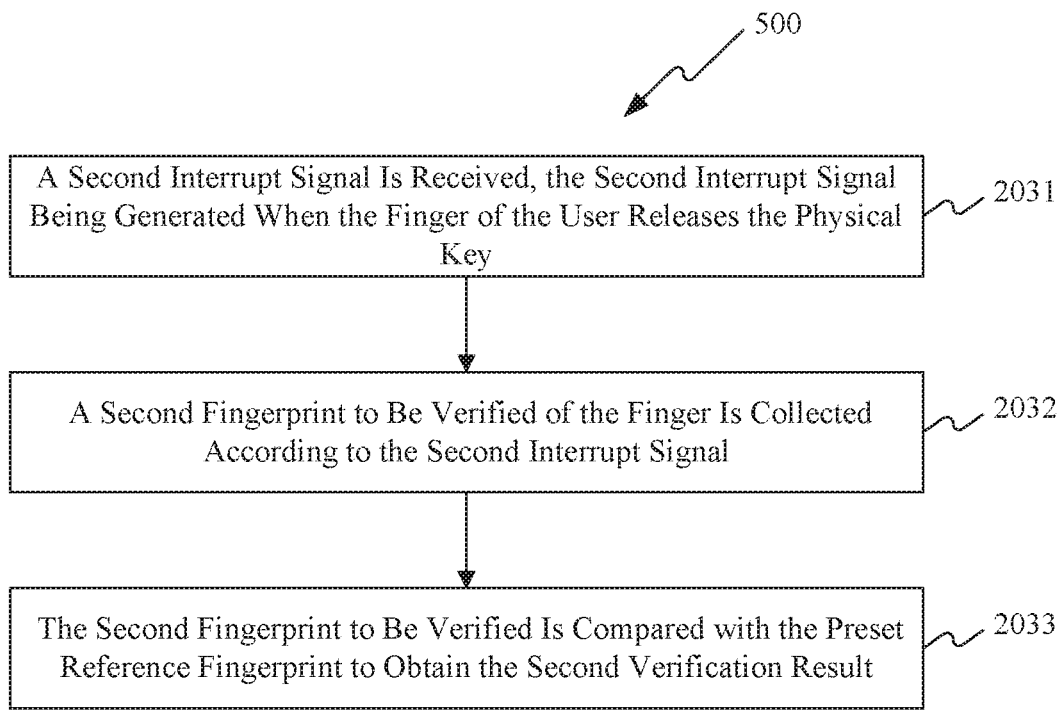
FIG. 5 is a flowchart of a method for a second fingerprint verification according to an exemplary embodiment.

FIG. 5 is a flow chart of a method 500 for performing the second fingerprint verification, according to an exemplary embodiment. The method 500 may be used in the step 203.

In step 2031, a second interrupt signal is received, the second interrupt signal being generated when the finger of the user releases the physical key.

In the exemplary embodiment, when the finger of the user releases the physical key, the fingerprint verification component receives the second interrupt signal. In FIG. 3, when a time at which the finger of the user releases the physical key is t4, the physical key is raised, and the fingerprint verification component receives the second interrupt signal at the time t4.

In step 2032, the second fingerprint to be verified (i.e., the second to-be-verified fingerprint) of the finger is collected according to the second interrupt signal.

In step 2033, the second to-be-verified fingerprint is compared with the preset reference fingerprint to obtain the second verification result.

In general, a time taken by the fingerprint verification component for performing the second fingerprint verification is relatively short, and the second fingerprint verification can be performed before the physical key returns to an initial state prior to being pressed. In FIG. 3, when a time at which the physical key returns to the initial state prior to being pressed is t5, the fingerprint verification component can obtain the second verification result before the time t5.

Referring back to FIG. 2, in step 204, the second verification result is used as a final verification result of fingerprint verification.

Regardless of whether the second verification result is a successful verification or a failed verification, the fingerprint verification component may use the second verification result as the final verification result.

In step 205, if the first verification result is a successful verification, the first verification result is used as the final verification result of fingerprint verification.

When the first verification result is a successful verification, there is no need to perform the second fingerprint verification which may waste computing resources. Therefore, the fingerprint verification component can directly use the first verification result as the final verification result.

In step 206, the final verification result is sent to the third-party program.

In FIG. 3, the fingerprint verification component sends the final verification result to the third-party program before the time t5. And the third-party program determines whether the verification is successful in accordance with the final verification result.

In some embodiments, when the final verification result is a failed verification, the third-party program may circle back to perform the step 201 until the final verification result is a successful verification, or until a number of calling the fingerprint verification component exceeds a preset threshold.

In the method 200 for fingerprint verification provided by the present disclosure, a first fingerprint verification is performed to obtain a first verification result in a process during which a physical key provided with a fingerprint verification component is pressed. If the first verification result is a failed verification, a second fingerprint verification is performed to obtain a second verification result in a process during which the physical key is raised. The second verification result is used as a final verification result of fingerprint verification. In this way, two fingerprint verifications may be performed when a user performs one pressing operation on the physical key. Thus, failure of fingerprint verification may be reduced or eliminated. Such failure of fingerprint verification may result from, for example, fingerprint deformation due to an excessive force during the pressing process or a displacement between the finger and the fingerprint verification component. Accordingly, the success rate of fingerprint verification may be improved.

When the first verification result is a successful verification, the first verification result is used as the final verification result of fingerprint verification. At this time, the second fingerprint verification is no longer performed, to save computing resources that may be consumed in performing the second fingerprint verification after the first fingerprint verification is successful.

Figure 6:
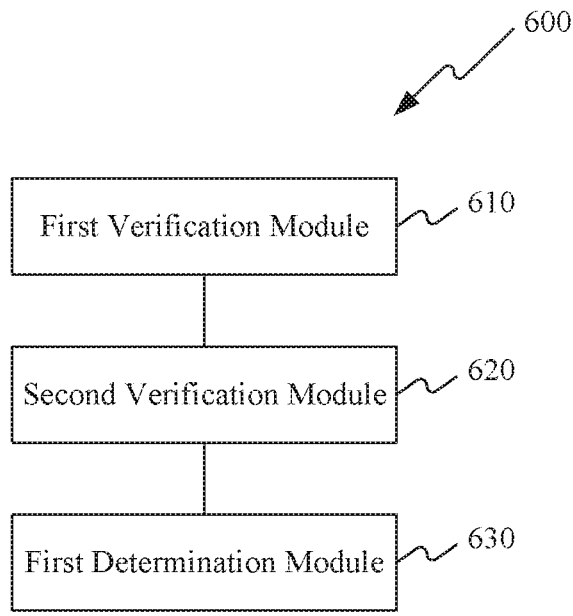
FIG. 6 is a block diagram of an apparatus for fingerprint verification according to an exemplary embodiment.

FIG. 6 is a block diagram of an apparatus 600 for fingerprint verification according to an exemplary embodiment. The apparatus 600 may be applied in a terminal that includes a physical key provided with a fingerprint verification component. As shown in FIG. 6, the apparatus 600 may include a first verification module 610, a second verification module 620, and a first determination module 630.

The first verification module 610 is configured to perform a first fingerprint verification to obtain a first verification result in a process during which the physical key provided with the fingerprint verification component is pressed.

The second verification module 620 is configured to, if the first verification result obtained by the first verification module 610 is a failed verification, perform a second fingerprint verification to obtain a second verification result in a process during which the physical key is raised.

The first determination module 630 is configured to use the second verification result obtained by the second verification module 620 as a final verification result of fingerprint verification.

In the apparatus 600 for fingerprint verification provided by the present disclosure, a first fingerprint verification is performed to obtain a first verification result in a process during which a physical key provided with a fingerprint verification component is pressed. If the first verification result is a failed verification, a second fingerprint verification is performed to obtain a second verification result in a process during which the physical key is raised. The second verification result is used as a final verification result of fingerprint verification. In this way, two fingerprint verifications may be performed when a user performs one pressing operation on the physical key. Thus, failure of fingerprint verification may be reduced or eliminated. Such failure of fingerprint verification may result from, for example, fingerprint deformation due to an excessive force during the pressing process or a displacement between the finger and the fingerprint verification component. Accordingly, the success rate of fingerprint verification may be improved.

Figure 7:
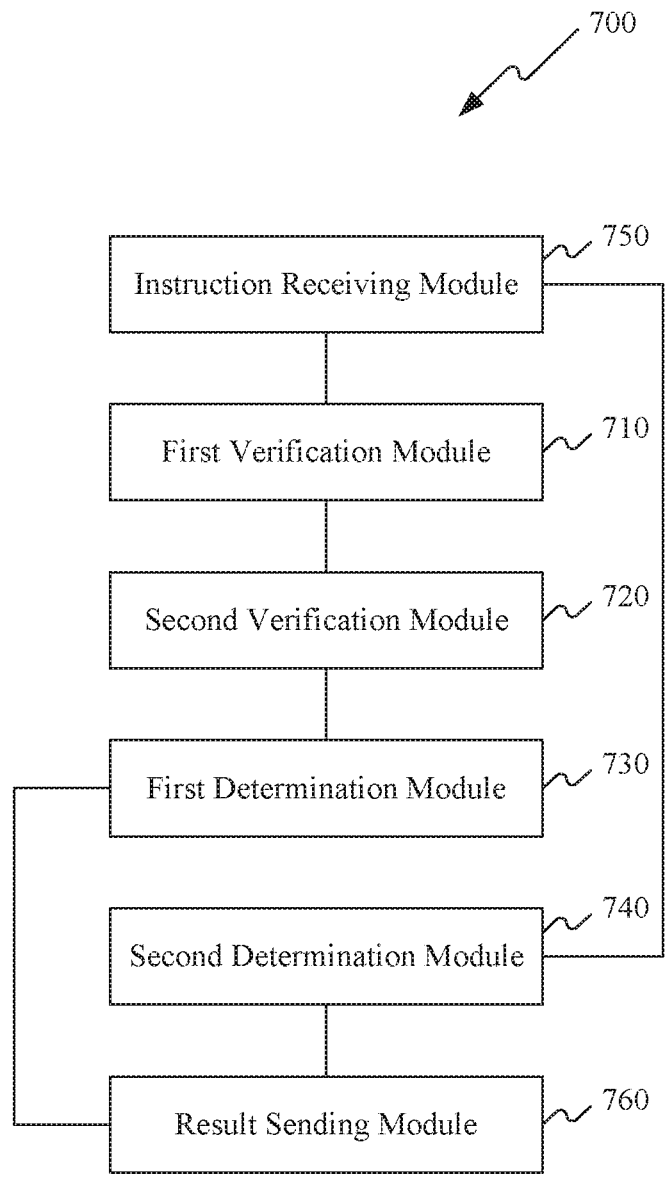
FIG. 7 is a block diagram of an apparatus for fingerprint verification according to another exemplary embodiment.

FIG. 7 is a block diagram of an apparatus 700 for fingerprint verification according to another exemplary embodiment. The apparatus 700 may be applied in a terminal that includes a physical key provided with a fingerprint verification component. As shown in FIG. 7, the apparatus 700 may include a first verification module 710, a second verification module 720, and a first determination module 730.

The first verification module 710 is configured to perform a first fingerprint verification to obtain a first verification result in a process during which the physical key provided with the fingerprint verification component is pressed.

The second verification module 720 is configured to, if the first verification result obtained by the first verification module 710 is a failed verification, perform a second fingerprint verification to obtain a second verification result in a process during which the physical key is raised.

The first determination module 730 is configured to use the second verification result obtained by the second verification module 720 as a final verification result of fingerprint verification.

In some embodiments, the apparatus 700 may further include a second determination module 740.

The second determination module 740 is configured to, if the first verification result obtained by the first verification module 710 is a successful verification, use the first verification result as the final verification result of fingerprint verification.

In some embodiments, the first verification module 710 is further configured to receive a first interrupt signal generated when a finger of a user contacts the physical key provided with the fingerprint verification component, to collect a first fingerprint to be verified (i.e., the first to-be-verified fingerprint) of the finger according to the first interrupt signal, and to compare the first to-be-verified fingerprint with a preset reference fingerprint to obtain the first verification result.

In some embodiments, the second verification module 720 is further configured to receive a second interrupt signal generated when the finger of the user releases the physical key, to collect a second fingerprint to be verified (i.e., the second to-be-verified fingerprint) of the finger according to the second interrupt signal, and to compare the second fingerprint with the preset reference fingerprint to obtain the second verification result.

In some embodiments, the apparatus 700 may further include an instruction receiving module 750 and a result sending module 760.

The instruction receiving module 750 is configured to receive a call instruction sent by a third-party program, and to trigger the first verification module 710 according to the call instruction. The first verification module 710 performs the first fingerprint verification to obtain the first verification result in the process during which the physical key provided with the fingerprint verification component is pressed.

The result sending module 760 is configured to send the final verification result to the third-party program.

In the apparatus 700 for fingerprint verification provided by the present disclosure, a first fingerprint verification is performed to obtain a first verification result in a process during which a physical key provided with a fingerprint verification component is pressed. If the first verification result is a failed verification, a second fingerprint verification is performed to obtain a second verification result in a process during which the physical key is raised. The second verification result is used as a final verification result of fingerprint verification. In this way, two fingerprint verifications may be performed when a user performs one pressing operation on the physical key. Thus, failure of fingerprint verification may be reduced or eliminated. Such failure of fingerprint verification may result from, for example, the fingerprint deformation due to an excessive force during the pressing process or a displacement between the finger and the fingerprint verification component. Accordingly, the success rate of fingerprint verification may be improved.

When the first verification result is a successful verification, the first verification result is used as the final verification result of the present fingerprint verification. At this time, the second fingerprint verification is no longer performed to reduce or eliminate the waste of computing resources that may be consumed in performing the second fingerprint verification after the first fingerprint verification is successful.

With respect to the apparatuses in the above exemplary embodiments, the specific manners for performing operations of each individual module therein have been described in detail in the exemplary embodiments regarding the methods, which will not be elaborated herein.

An exemplary terminal may also be provided for fingerprint verification which is able to implement the methods for fingerprint verification provided by the present disclosure. The exemplary terminal may include a processor and a memory for storing instructions executable by the processor.

The processor may be configured to perform a first fingerprint verification to obtain a first verification result in a process during which a physical key provided with a fingerprint verification component is pressed, (if the first verification result is a failed verification) to perform a second fingerprint verification to obtain a second verification result in a process during which the physical key is raised, and to use the second verification result as a final verification result of fingerprint verification.

Figure 8:
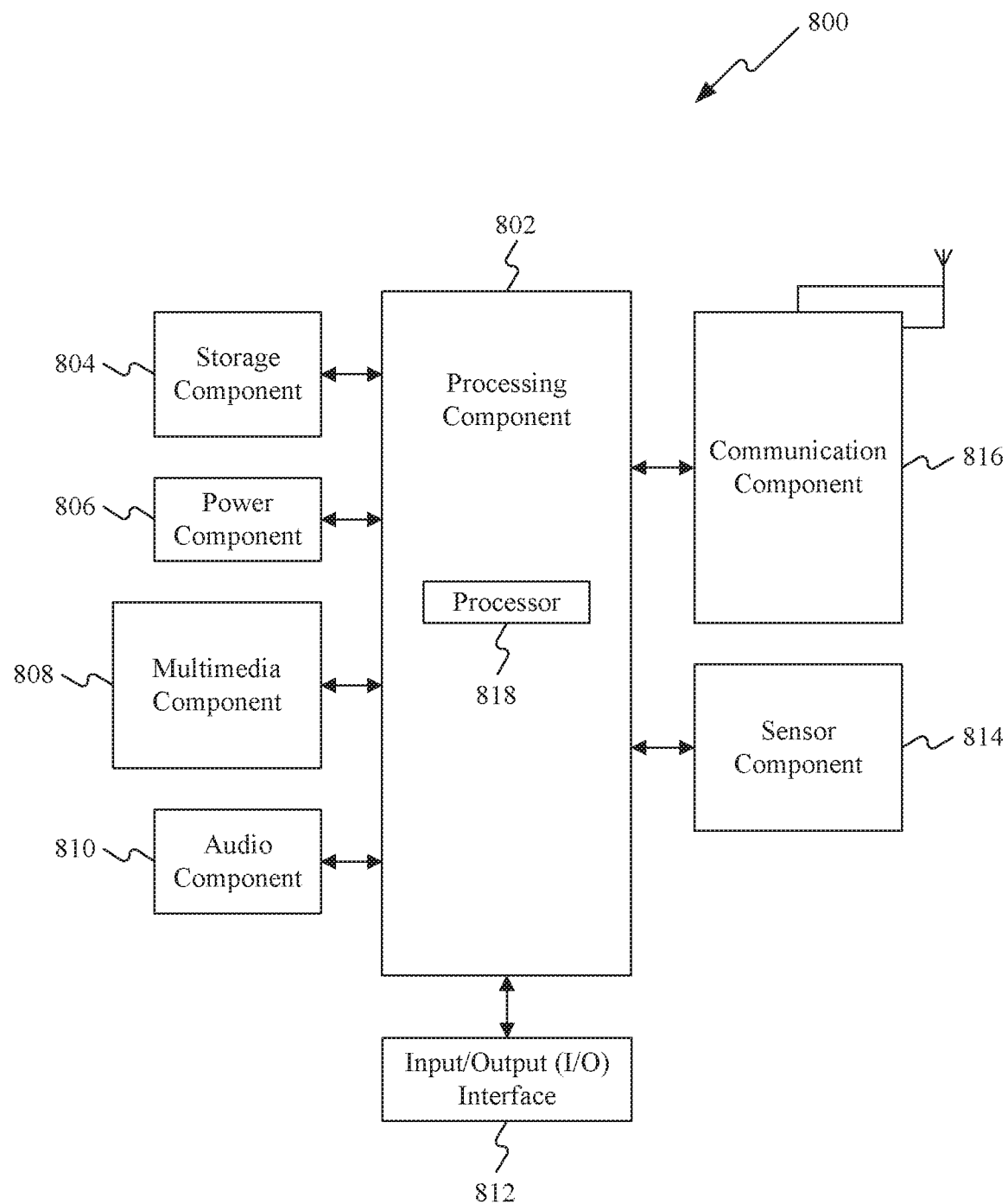
FIG. 8 is a block diagram of a device for fingerprint verification according to an exemplary embodiment.

FIG. 8 is a block diagram of a device, e.g., a terminal 800, for fingerprint verification according to an exemplary embodiment. For example, the terminal 800 may be a mobile phone, a computer, a digital broadcast terminal, a messaging device, a gaming console, a tablet, a medical device, exercise equipment, a personal digital assistant, and the like.

Referring to FIG. 8, the terminal 800 may include one or more of the following components: a processing component 802, a storage component 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 818 to execute instructions to perform all or part of the steps in the above described methods. Moreover, the processing component 802 may include one or more modules which facilitate interactions between the processing component 802 and other components. For instance, the processing component 802 may include a multimedia module to facilitate interactions between the multimedia component 808 and the processing component 802.

The storage component 804 is configured to store various types of data to support the operation of the terminal 800. Examples of such data include instructions for any applications or methods operated on the terminal 800, contact data, phonebook data, messages, pictures, video, etc. The storage component 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the terminal 800.

The multimedia component 808 may include a screen providing an output interface between the terminal 800 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 may include a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 may include a microphone ("MIC") configured to receive an external audio signal when the terminal 800 is in an operation mode, such as a calling mode, a recording mode, and a voice recognition mode. The received audio signal may be further stored in the storage component 804 or transmitted via the communication component 816. In some embodiments, the audio component 810 may further include a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 may include one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communications between the terminal 800 and other devices. The terminal 800 can access a wireless network based on a communication standard, such as WiFi, 2G or 3G or a combination thereof. In one exemplary embodiment, the communication component 816 receives a broadcast signal from an external broadcast management system via a broadcast channel or broadcast associated information. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium having instructions stored thereon is also provided, such as the storage component 804 having stored thereon instructions executable by the processor 818 in the terminal 800, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for fingerprint verification, comprising:
performing a first fingerprint verification to obtain a first verification result in a first process during which a physical key provided with a fingerprint verification component is pressed, wherein the first fingerprint verification is performed before a user completes pressing the physical key;
if the first verification result is a failed verification, performing a second fingerprint verification to obtain a second verification result in a second process during which the physical key is physically raised, the physical key being physically raised with respect to a position of the physical key during the first process; and
using the second verification result as a final verification result of fingerprint verification,
wherein the method further comprises:
receiving a call instruction sent by a third-party program;
performing, in accordance with the call instruction, the first fingerprint verification to obtain the first verification result in the first process during which the physical key provided with the fingerprint verification component is pressed; and
sending the final verification result to the third-party program.

2. The method according to claim 1, further comprising:
if the first verification result is a successful verification, using the first verification result as the final verification result of fingerprint verification.

3. The method according to claim 1, wherein the performing the first fingerprint verification to obtain the first verification result in the first process during which the physical key having the fingerprint verification component is pressed comprises:
receiving a first interrupt signal generated when a finger of a user contacts the physical key;

collecting a first fingerprint of the finger in accordance with the first interrupt signal; and comparing the first fingerprint with a preset reference fingerprint to obtain the first verification result.

4. The method according to claim 3, wherein the performing the second fingerprint verification to obtain the second verification result in the second process during which the physical key is physically raised comprises:

receiving a second interrupt signal generated when the finger of the user releases the physical key;

collecting a second fingerprint of the finger in accordance with the second interrupt signal; and comparing the second fingerprint with the preset reference fingerprint to obtain the second verification result.

5. A device for fingerprint verification, comprising:

a processor; and a memory for storing instructions executable by the processor;

wherein the processor is configured to:

perform a first fingerprint verification to obtain a first verification result in a first process during which a physical key provided with a fingerprint verification component is pressed, wherein the first fingerprint verification is performed before a user completes pressing the physical key;

if the first verification result is a failed verification, perform a second fingerprint verification to obtain a second verification result in a second process during which the physical key is physically raised, the physical key being physically raised with respect to a position of the physical key during the first process; and use the second verification result as a final verification result of fingerprint verification, wherein the processor is further configured to:

receive a call instruction sent by a third-party program;

perform, in accordance with the call instruction, the first fingerprint verification to obtain the first verification result in the first process during which the physical key provided with the fingerprint verification component is pressed; and send the final verification result to the third-party program.

6. The device according to claim 5, wherein the processor is further configured to:

if the first verification result is a successful verification, use the first verification result as the final verification result of fingerprint verification.

7. The device according to claim 5, wherein the processor is further configured to:

receive a first interrupt signal generated when a finger of a user contacts the physical key;

collect a first fingerprint of the finger in accordance with the first interrupt signal; and compare the first fingerprint with a preset reference fingerprint to obtain the first verification result.

8. The device according to claim 7, wherein the processor is further configured to:

receive a second interrupt signal generated when the finger of the user releases the physical key;

collect a second fingerprint of the finger in accordance with the second interrupt signal; and compare the second fingerprint with the preset reference fingerprint to obtain the second verification result.

9. A non-transitory computer-readable storage medium having stored thereon instructions that, when executed by a processor of a device, cause the device to perform a method for fingerprint verification, the method comprising:

performing a first fingerprint verification to obtain a first verification result in a first process during which a physical key provided with a fingerprint verification component is pressed, wherein the first fingerprint verification is performed before a user completes pressing the physical key;

if the first verification result is a failed verification, performing a second fingerprint verification to obtain a second verification result in a second process during which the physical key is physically raised, the physical key being physically raised with respect to a position of the physical key during the first process; and using the second verification result as a final verification result of fingerprint verification, wherein the method further comprises:

receiving a call instruction sent by a third-party program;

performing, in accordance with the call instruction, the first fingerprint verification to obtain the first verification result in the first process during which the physical key provided with the fingerprint verification component is pressed; and sending the final verification result to the third-party program.

10. The non-transitory computer-readable storage medium according to claim 9, wherein the method further comprises:

if the first verification result is a successful verification, using the first verification result as the final verification result of fingerprint verification.

11. The non-transitory computer-readable storage medium according to claim 9, wherein the method further comprises:

receiving a first interrupt signal generated when a finger of a user contacts the physical key;

collecting a first fingerprint of the finger in accordance with the first interrupt signal; and comparing the first fingerprint with a preset reference fingerprint to obtain the first verification result.

12. The non-transitory computer-readable storage medium according to claim 11, wherein the method further comprises:

receiving a second interrupt signal generated when the finger of the user releases the physical key;

collecting a second fingerprint of the finger in accordance with the second interrupt signal; and comparing the second fingerprint with the preset reference fingerprint to obtain the second verification result.

* * * * *